(12) United States Patent
Matsumoto (10) Patent No.: US 10,875,122 B2
(45) Date of Patent: Dec. 29, 2020

(54) SCANNER CONTROLLER, ROBOT CONTROLLER, AND REMOTE LASER WELDING ROBOT SYSTEM

(71) Applicant: FANUC CORPORATION, Yamanashi (JP)

(72) Inventor: Takayoshi Matsumoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 145 days.

(21) Appl. No.: 15/922,324

(22) Filed: Mar. 15, 2018

(65) Prior Publication Data

US 2018/0333805 A1    Nov. 22, 2018

(30) Foreign Application Priority Data

Mar. 17, 2017  (JP) ................................ 2017-053498

(51) Int. Cl.
| | | |
|---|---|---|
| *B23K 26/08* | (2014.01) | |
| *B23K 26/082* | (2014.01) | |
| *B23K 26/21* | (2014.01) | |
| *G05B 19/416* | (2006.01) | |

(52) U.S. Cl.
CPC ........ *B23K 26/0884* (2013.01); *B23K 26/082* (2015.10); *B23K 26/21* (2015.10); *G05B 19/416* (2013.01); *G05B 2219/45104* (2013.01)

(58) Field of Classification Search
CPC .. B23K 26/0884; B23K 26/082; B23K 26/21; G05B 19/416; G05B 2219/45104
USPC .................................................... 219/121.63
See application file for complete search history.

(56) References Cited

U.S. PATENT DOCUMENTS

| | | | | |
|---|---|---|---|---|
| 4,452,533 A | * | 6/1984 | Miles ..................... | G01D 5/266 356/506 |
| 4,529,864 A | * | 7/1985 | Bennett .................. | B23K 9/125 219/137 PS |
| 4,621,333 A | * | 11/1986 | Watanabe .............. | G05B 19/41 219/125.12 |
| 4,650,952 A | * | 3/1987 | Akeel ................ | B23K 26/0884 219/121.74 |
| 4,661,680 A | * | 4/1987 | Swensrud .......... | B23K 26/0884 219/121.78 |

(Continued)

FOREIGN PATENT DOCUMENTS

| | | |
|---|---|---|
| CN | 102672311 A | 9/2012 |
| CN | 105364266 A | 3/2016 |

(Continued)

OTHER PUBLICATIONS

Notification of Reasons for Refusal of Japanese Application No. 2017-053498, dated Nov. 20, 2018 wth translation, 5 pages.

(Continued)

*Primary Examiner* — Eric S Stapleton
(74) *Attorney, Agent, or Firm* — RatnerPrestia (57) ABSTRACT

A scanner controller has an acceleration/deceleration computation unit configured to perform an acceleration/deceleration control for an instructed speed and controls a laser output power depending on the instructed speed and a result of the acceleration/deceleration control. This scanner controller further has a robot deceleration rate computation/determination unit configured to externally output information on a speed after being subjected to the acceleration/deceleration control.

6 Claims, 6 Drawing Sheets

(56) References Cited

U.S. PATENT DOCUMENTS

| | | | | |
|---|---|---|---|---|
| 4,689,756 A * | 8/1987 | Koyama | G05B 19/41 | 318/573 |
| 4,831,316 A * | 5/1989 | Ishiguro | G05B 19/425 | 318/573 |
| 4,835,710 A * | 5/1989 | Schnelle | G05B 19/41 | 318/568.11 |
| 4,879,663 A * | 11/1989 | Fuehrer | G05B 19/41 | 700/250 |
| 4,904,068 A * | 2/1990 | Tatsuno | G02B 27/09 | 359/559 |
| 4,907,169 A * | 3/1990 | Lovoi | B23K 26/04 | 219/124.34 |
| 5,151,608 A * | 9/1992 | Torii | G01S 17/48 | 250/559.38 |
| 5,302,802 A * | 4/1994 | Fujinaga | B23K 26/0884 | 219/121.74 |
| 5,371,337 A * | 12/1994 | Campbell | B23K 26/18 | 219/121.63 |
| 5,379,367 A * | 1/1995 | Song | B25J 9/1679 | 700/52 |
| 5,396,160 A * | 3/1995 | Chen | B25J 9/1664 | 318/571 |
| 5,408,065 A * | 4/1995 | Campbell | B23K 26/0884 | 219/121.6 |
| 5,438,522 A * | 8/1995 | Crovella | G05B 19/4103 | 318/568.15 |
| 5,489,758 A * | 2/1996 | Nihei | B23K 26/046 | 219/121.63 |
| 5,602,968 A * | 2/1997 | Volpe | B25J 9/1664 | 318/568.18 |
| 5,837,960 A * | 11/1998 | Lewis | B23K 26/34 | 219/121.63 |
| 5,887,122 A * | 3/1999 | Terawaki | B23K 9/1274 | 700/258 |
| 5,925,271 A * | 7/1999 | Pollack | B23K 26/02 | 219/121.74 |
| 5,959,864 A * | 9/1999 | Mori | G05B 19/416 | 318/600 |
| 6,167,328 A * | 12/2000 | Takaoka | B25J 9/1671 | 318/568.1 |
| 6,285,920 B1 * | 9/2001 | McGee | G05B 19/423 | 219/125.11 |
| 6,374,158 B1 * | 4/2002 | Fusaro, Jr. | B23K 10/027 | 700/254 |
| 6,429,404 B1 * | 8/2002 | Suzuki | B23K 9/0216 | 219/124.34 |
| 6,430,472 B1 * | 8/2002 | Boillot | G05B 19/056 | 219/121.61 |
| 6,434,448 B1 * | 8/2002 | Kosaka | B25J 9/1674 | 318/568.11 |
| 6,657,156 B2 * | 12/2003 | Kubota | B23K 26/04 | 219/121.63 |
| 6,822,187 B1 * | 11/2004 | Hermann | B23K 26/0884 | 219/121.63 |
| 6,888,853 B1 * | 5/2005 | Jurgensen | B23K 26/0604 | 372/6 |
| 6,974,930 B2 * | 12/2005 | Jense | B23K 26/0846 | 219/121.8 |
| 7,038,165 B2 * | 5/2006 | Okuda | B23K 26/04 | 219/121.78 |
| 7,076,322 B2 * | 7/2006 | Chandhoke | G05B 19/416 | 318/560 |
| 7,103,499 B2 * | 9/2006 | Goodwin | G06F 3/016 | 318/568.11 |
| 7,130,718 B2 * | 10/2006 | Gunnarsson | B25J 9/1638 | 700/254 |
| 7,248,940 B2 * | 7/2007 | Neumann | B23K 26/046 | 219/121.6 |
| 7,560,659 B2 * | 7/2009 | Menin | B23K 26/244 | 219/121.64 |
| 7,906,744 B2 * | 3/2011 | Rippl | B23K 26/0884 | 219/121.63 |
| 8,244,403 B2 * | 8/2012 | Lin | G05D 1/0246 | 180/168 |
| 8,315,739 B2 * | 11/2012 | Dai | B25J 9/1697 | 382/153 |
| 8,412,371 B2 * | 4/2013 | Komatsu | B23K 26/04 | 219/121.63 |
| 8,536,483 B2 * | 9/2013 | Thomas | B08B 7/0042 | 219/121.68 |
| 8,965,556 B2 * | 2/2015 | Oe | B23K 26/0884 | 700/166 |
| 10,052,759 B2 * | 8/2018 | Tao | B23K 26/0884 | |
| 2002/0104834 A1 * | 8/2002 | Mangiarino | B23K 26/082 | 219/121.78 |
| 2003/0033029 A1 * | 2/2003 | Kohler | G05B 19/4103 | 700/13 |
| 2003/0033052 A1 * | 2/2003 | Hillen | G05B 19/042 | 700/212 |
| 2003/0193522 A1 * | 10/2003 | Chandhoke | G05B 19/416 | 715/764 |
| 2004/0107026 A1 * | 6/2004 | Kroth | B23K 26/0884 | 700/304 |
| 2004/0111185 A1 * | 6/2004 | Gmeiner | B25J 9/1664 | 700/245 |
| 2004/0206735 A1 * | 10/2004 | Okuda | B23K 26/0884 | 219/121.78 |
| 2005/0013328 A1 * | 1/2005 | Jurgensen | B23K 26/0884 | 372/6 |
| 2005/0061781 A1 * | 3/2005 | Jense | B23K 26/0846 | 219/121.8 |
| 2005/0150876 A1 * | 7/2005 | Menin | B23K 26/082 | 219/121.63 |
| 2006/0060573 A1 * | 3/2006 | Becker | B23K 26/0884 | 219/121.64 |
| 2006/0113392 A1 * | 6/2006 | Otsuka | B23K 26/08 | 235/462.36 |
| 2006/0175301 A1 * | 8/2006 | Rippl | B23K 26/0884 | 219/121.8 |
| 2006/0249488 A1 * | 11/2006 | Jurgensen | B23K 26/142 | 219/121.68 |
| 2006/0249491 A1 * | 11/2006 | Jurgensen | B23K 26/0823 | 219/121.69 |
| 2006/0250658 A1 * | 11/2006 | Jurgensen | B23K 26/40 | 358/3.29 |
| 2006/0255023 A1 * | 11/2006 | Jurgensen | B23K 26/064 | 219/121.69 |
| 2006/0279794 A1 * | 12/2006 | Jurgensen | B23K 26/0665 | 358/3.29 |
| 2006/0287769 A1 * | 12/2006 | Yanagita | B25J 9/1669 | 700/245 |
| 2007/0050085 A1 * | 3/2007 | Hashimoto | B25J 9/1682 | 700/245 |
| 2007/0221638 A1 * | 9/2007 | Yoshikawa | B23K 26/0884 | 219/121.63 |
| 2008/0035619 A1 * | 2/2008 | Hamaguchi | B23K 26/0884 | 219/121.79 |
| 2008/0161964 A1 * | 7/2008 | Irie | B23K 26/0884 | 700/166 |
| 2008/0192104 A1 * | 8/2008 | Nye | B29C 64/20 | 347/110 |
| 2008/0292358 A1 * | 11/2008 | Ku | G02B 26/127 | 399/128 |
| 2009/0002474 A1 * | 1/2009 | Ishibe | B41J 2/473 | 347/243 |
| 2009/0168111 A9 * | 7/2009 | Jurgensen | B23K 26/064 | 358/3.29 |
| 2009/0218475 A1 * | 9/2009 | Kawakami | B23K 26/0738 | 250/201.1 |
| 2010/0174407 A1 * | 7/2010 | Fukawa | B23K 26/04 | 700/245 |
| 2010/0252543 A1 * | 10/2010 | Manens | B23K 26/702 | 219/121.69 |
| 2011/0197654 A1 * | 8/2011 | Reifel | G01N 21/39 | 73/23.36 |
| 2011/0253690 A1 * | 10/2011 | Dane | B23K 26/0884 | 219/121.74 |

(56) References Cited

U.S. PATENT DOCUMENTS

| | | | | |
|---|---|---|---|---|
| 2011/0297654 | A1* | 12/2011 | Yoshikawa | B23K 26/082 219/121.62 |
| 2012/0255937 | A1* | 10/2012 | Oe | B23K 26/26 219/121.63 |
| 2012/0255938 | A1* | 10/2012 | Oe | B23K 26/082 219/124.22 |
| 2012/0298639 | A1* | 11/2012 | Wang | B23K 9/133 219/121.64 |
| 2013/0190898 | A1 | 7/2013 | Shilpiekandula et al. | |
| 2013/0200053 | A1* | 8/2013 | Bordatchev | B23Q 15/12 219/121.78 |
| 2014/0046471 | A1* | 2/2014 | Bamford | G05B 19/048 700/110 |
| 2014/0144895 | A1* | 5/2014 | Stork Genannt Wersborg | B23K 26/38 219/121.75 |
| 2014/0203007 | A1* | 7/2014 | Uecker | B23K 9/09 219/130.51 |
| 2014/0297033 | A1* | 10/2014 | Tao | B23K 26/70 700/250 |
| 2015/0198052 | A1* | 7/2015 | Pavlov | B22F 5/009 416/241 B |
| 2015/0352667 | A1* | 12/2015 | Hemes | B23K 26/082 219/121.61 |
| 2015/0375344 | A1* | 12/2015 | Adcock | G05B 19/402 219/76.1 |

FOREIGN PATENT DOCUMENTS

| | | |
|---|---|---|
| JP | 2004314137 A | 11/2004 |
| JP | 2006187803 A | 7/2006 |
| JP | 2007-283402 A | 11/2007 |
| JP | 2009082945 A | 4/2009 |
| JP | 2010214393 A | 9/2010 |
| JP | 2012139711 A | 7/2012 |
| JP | 2014198373 A | 10/2014 |

OTHER PUBLICATIONS

Chinese Office Action for Chinese Application No. 201810218225.2, dated Oct. 15, 2019 with translation, 12 pages.

German Examination Report for German Application No. DE102018105587.0, dated Jun. 10, 2020 with translation, 9 pages.

* cited by examiner

SCANNER CONTROLLER, ROBOT CONTROLLER, AND REMOTE LASER WELDING ROBOT SYSTEM

CROSS REFERENCE TO RELATED APPLICATION

This application is a new U.S. patent application that claims benefit of Japanese Patent Application No. 2017-053498, filed Mar. 17, 2017, the disclosure of this application is being incorporated herein by reference in its entirety for all purposes.

BACKGROUND OF THE INVENTION

1. Field of the Invention

The present invention relates to a scanner controller, a robot controller, and a remote laser welding robot system, and more particularly, to a technology for improving machining route accuracy in such a device and system.

2. Description of the Related Art

Figure 1:
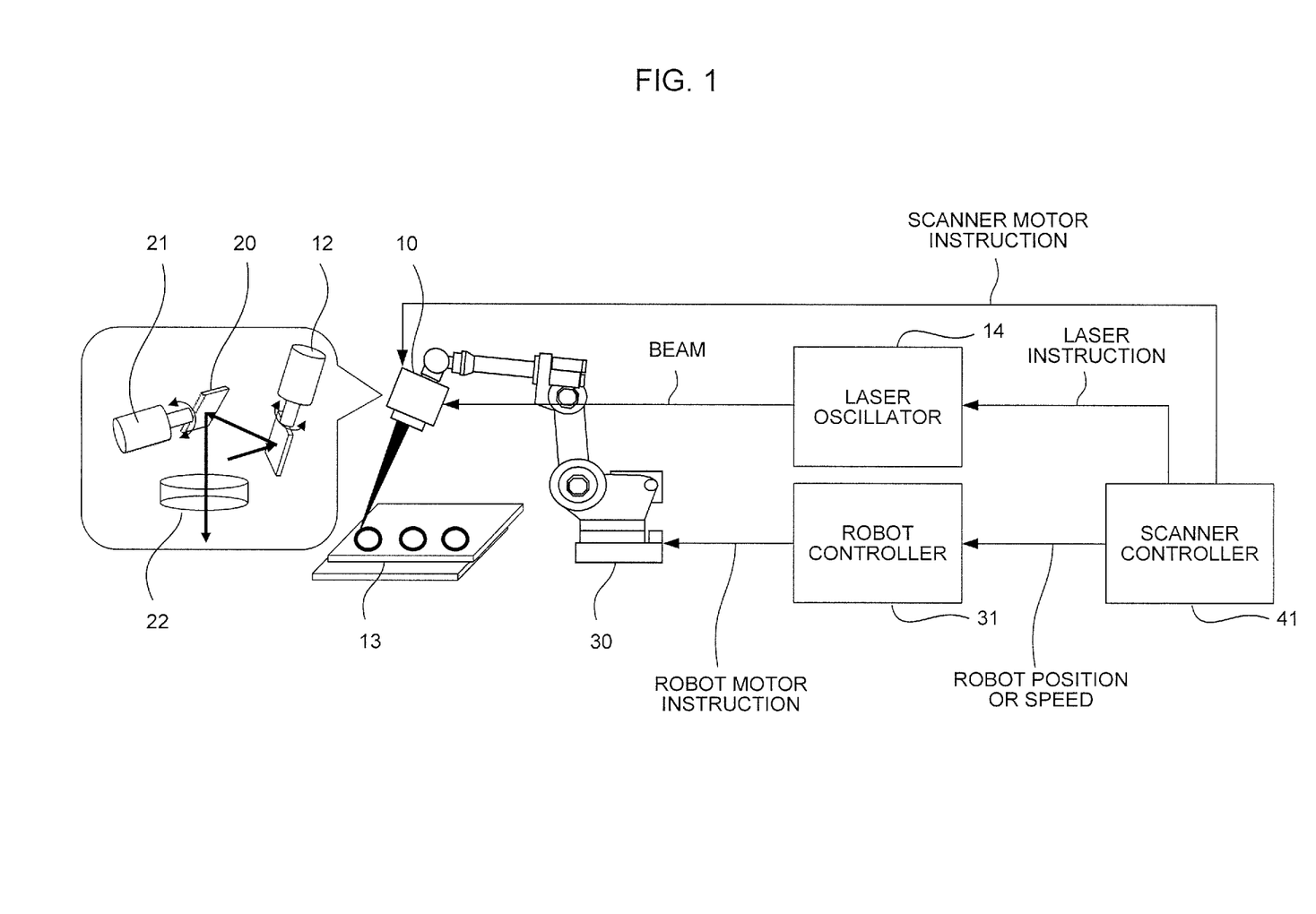
FIG. 1 is a diagram illustrating an example of a conventional remote laser welding robot system.

A welding technology by irradiating laser beams from a distant position from a workpiece is called "remote laser welding." As one of means for controlling a machining route in the remote laser welding, a galvanoscanner is known in the art. As illustrated in FIG. 1, the galvanoscanner 10 (hereinafter, simply referred to as a "scanner") is a device that scans laser light in an arbitrary route by operating one or more mirrors 20 (for example, two mirrors when laser beams are controlled in the X and Y directions) in a laser optical system. A remote laser welding robot system in which this scanner 10 is installed in a tip of a robot 30 (that is, in a root hand) has been commercialized. In the remote laser welding robot system of FIG. 1, the scanner 10 is operated while the robot 30 is caused to move. Therefore, it is possible to perform welding in a more complicated machining route, compared to a case where a single scanner is operated.

Typically, the robot controller 31 that controls the robot 30 controls motors (not shown) of the robot 30 on the basis of a movement instruction program of the robot 30. Meanwhile, a scanner controller 41 that controls the scanner 10 controls the output power of the laser and a motor 12 of the scanner 10 on the basis of a program that describes a laser irradiation position and a laser output condition (power). In order to implement the remote laser welding robot system described above, it is necessary to allow the robot controller 31 to transmit a position or speed of the robot 30 during an operation to the scanner controller, and allow a scanner controller 41 to create an actual machining route considering the operation of the robot 30 (see Japanese Patent Application Laid-Open No. 2007-283402). Note that, in FIG. 1, reference numerals 21, 22, 13 and 14 denote a motor for driving the mirror, a cover glass, a workpiece, and a laser oscillator, respectively.

However, in the remote laser welding robot system of the related art, the machining route is not implemented as instructed in a route where deceleration occurs, such as a corner portion. This is because the route computation process of the robot and the route computation process of the scanner are performed independently, so that the robot does not easily follow the movement of the scanner when the scanner is decelerated.

Figure 2:
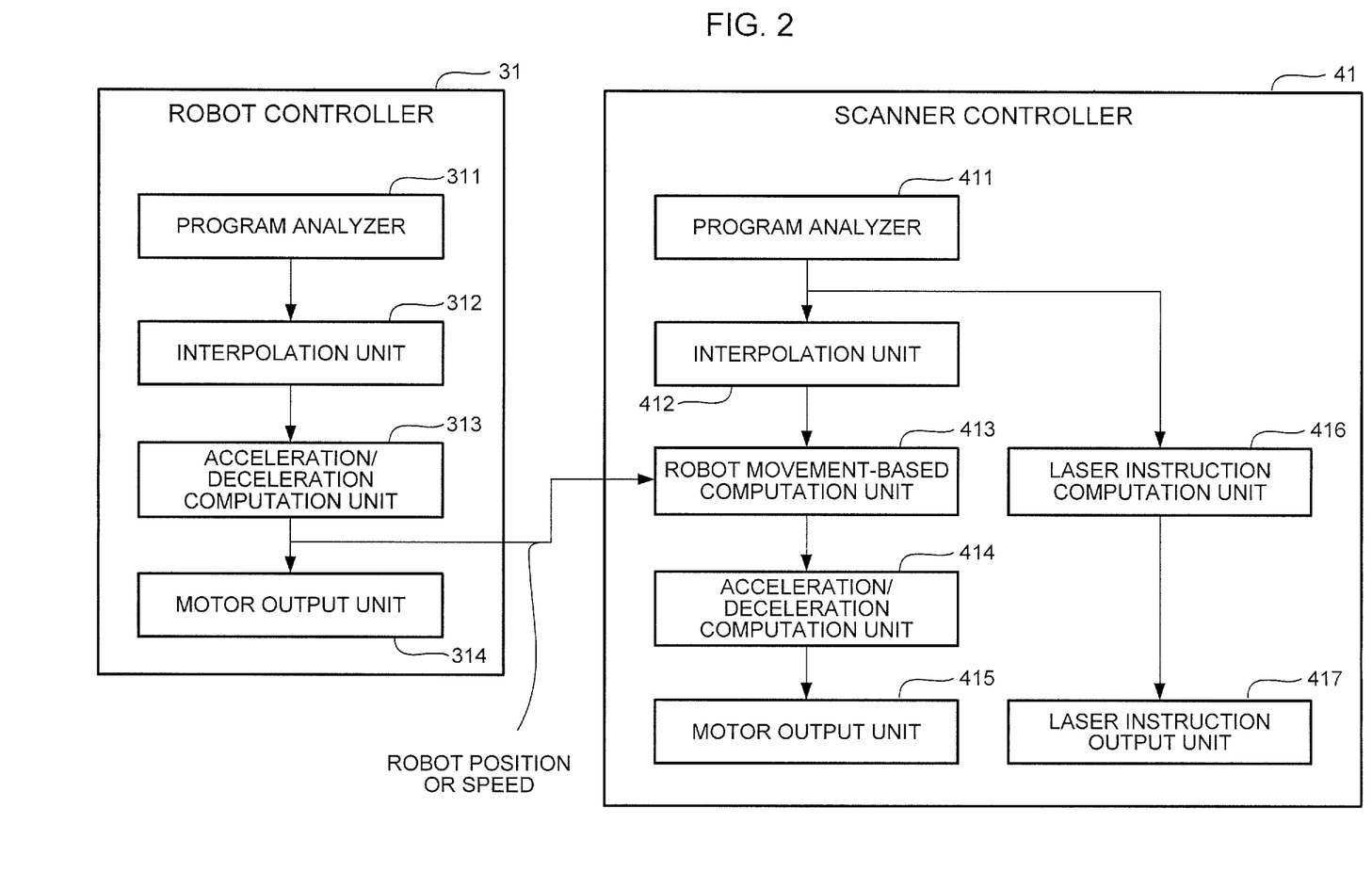
FIG. 2 is a diagram illustrating a problem of the related art.

A mechanism of this problem will be described with reference to FIG. 2.

A movement route and a movement speed of the robot 30 are computed as a program analyzer 311 of the robot controller 31 analyzes the program, and the interpolation unit 312 performs interpolation. In addition, the acceleration/deceleration computation unit 313 of the robot controller 31 applies acceleration or deceleration suitable for the movement speed of the robot 30 considering various conditions. As a result, a position and a speed of the robot 30 at a certain timing are finally determined, and the determined position and speed of the robot 30 are also notified to the scanner controller 41.

Meanwhile, similarly, the scanner controller 41 also computes a laser scanning route and a scanning speed as the program analyzer 411 analyzes the program, and the interpolation unit 412 performs interpolation. In addition, a robot movement-based computation unit 413 corrects the scanning route and the scanning speed of the laser considering the current position or movement speed of the robot 30 notified from the robot controller 31. Then, the acceleration/deceleration computation unit 414 of the scanner controller 41 applies acceleration or deceleration suitable for the laser scanning speed considering various conditions.

In this manner, in the scanner controller 41, acceleration or deceleration is performed after the correction computation is completed considering the movement of the robot 30. A problem that can be generated in this case is illustrated in FIGS. 3A to 3C.

Figure 3A:
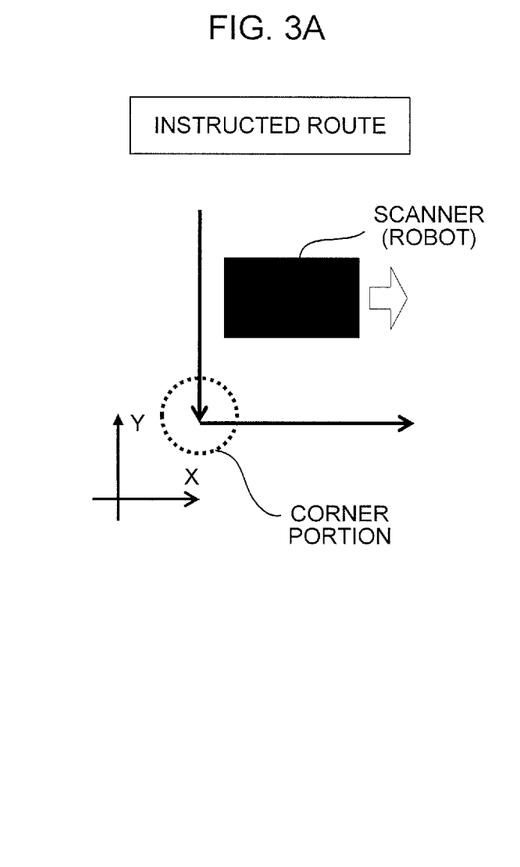
FIGS. 3A, 3B and 3C are diagrams illustrating a problem of the related art.
Figure 3B:
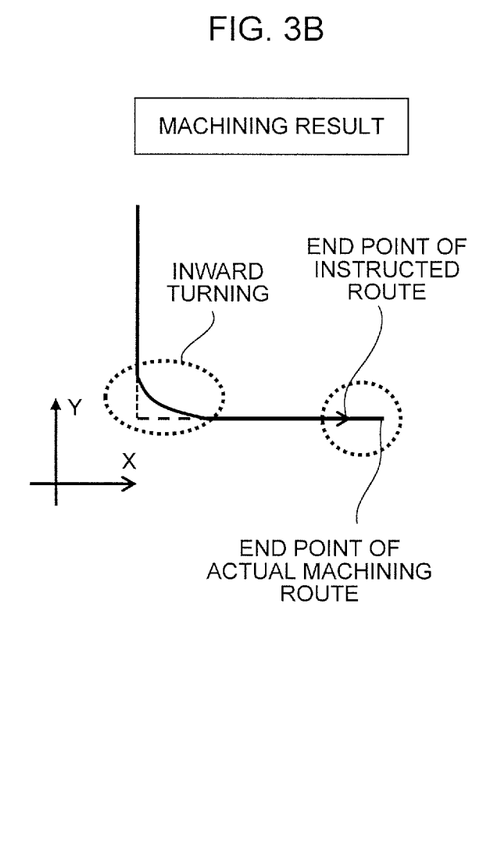

In FIG. 3A, the solid arrow indicates an instructed route for laser scanning. Typically, the scanner 10 can irradiate laser onto the workpiece 13 to follow the instructed route on the basis of a functionality of the robot movement-based computation unit 413 even while the robot 30 moves.

Meanwhile, for example, when a corner portion is included in the instructed route, the acceleration/deceleration computation unit 414 of the scanner controller 41 accelerates or decelerates the scanner 10 around the corner portion. The aforementioned correction computation using the robot movement-based computation unit 413 does not consider such acceleration or deceleration. Therefore, if the scanner controller 41 controls acceleration or deceleration, the movement of the robot 30 affects the machining route. For example, when the robot 30 moves in the X-axis direction at a constant speed as illustrated in FIG. 3A, and the scanner controller 41 performs an acceleration/deceleration control in the corner portion, an actual machining route becomes different from the instructed route as illustrated in FIG. 3B. That is, since the robot 30 moves in the X-axis direction at a constant speed while the laser scanner is decelerated in the Y-axis direction, a route turning inward of the corner portion is generated. In addition, a practical end point of the machining route is deviated from an end point of the instructed route. This phenomenon degrades machining route accuracy in the remote laser welding robot system.

Figure 3C:
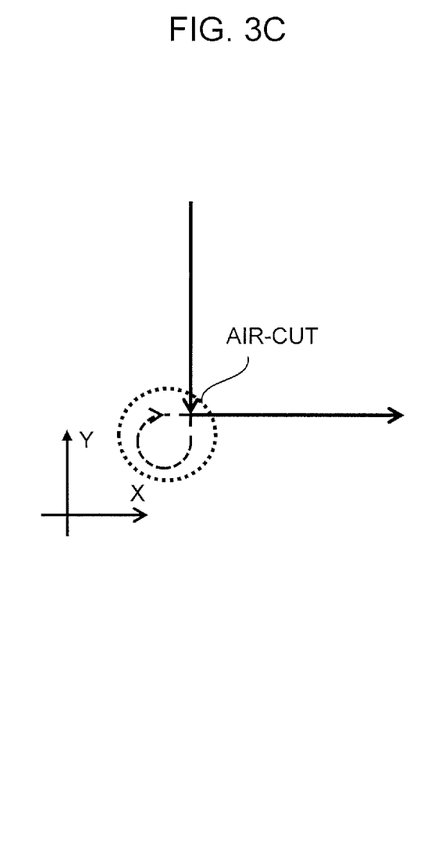

In order to avoid such a problem, a method of generating no acceleration or deceleration in the corner portion or the like by inserting an air-cut (a route having no beam) into the instructed route as illustrated in FIG. 3C is known in the art. However, in this method, the program becomes complicated. In addition, it is basically difficult to determine where acceleration or deceleration is performed in advance.

SUMMARY OF THE INVENTION

In view of the aforementioned problems, an object of the invention is to provide a scanner controller, a robot controller, and a remote laser welding robot system capable of improving machining route accuracy.

According to an aspect of the invention, there is provided a scanner controller including: an acceleration/deceleration computation unit configured to perform an acceleration or deceleration control for an instructed speed to control a laser output power depending on the instructed speed and a result of the acceleration/deceleration control; and a robot deceleration rate computation/determination unit configured to externally output information on a speed after being subjected to the acceleration/deceleration control.

The robot deceleration rate computation/determination unit may output information on a ratio between the speed after being subjected to the acceleration/deceleration control and the instructed speed.

The instructed speed may be obtained by correcting a machining speed instructed from a program depending on a movement of the robot installed with the scanner.

According to another aspect of the invention, there is provided a robot controller including: an acceleration/deceleration computation unit configured to perform an acceleration/deceleration control for an instructed speed to control a movement of a robot depending on the instructed speed and a result of the acceleration/deceleration control; and an override unit configured to externally receive information on a laser scanning speed output from a scanner installed in the robot and change the instructed speed on the basis of the information on the laser scanning speed, in which the acceleration/deceleration computation unit is configured to perform the acceleration/deceleration control for the changed instructed speed.

According to still another aspect of the invention, there is provided a remote laser welding robot system including: a first acceleration/deceleration computation unit configured to perform a first acceleration/deceleration control for a first instructed speed; a robot deceleration rate computation/determination unit configured to output information on a speed after being subjected to the first acceleration/deceleration control; a scanner controller configured to control a laser output power depending on the first instructed speed and a result of the first acceleration/deceleration control; a second acceleration/deceleration computation unit configured to perform a second acceleration/deceleration control for a second instructed speed; an override unit configured to receive information on a speed after being subjected to the first acceleration/deceleration control and change the second instructed speed on the basis of information on the speed after being subjected to the first acceleration/deceleration control; and a robot controller configured to control a movement of the robot, in which the second acceleration/deceleration computation unit is configured to perform the second acceleration/deceleration control for the changed second instructed speed, and the robot controller is configured to control a movement of the robot depending on the changed second instructed speed and a result of the second acceleration/deceleration control.

According to the invention, it is possible to provide a scanner controller, a robot controller, and a remote laser welding robot system capable of improving machining route accuracy.

DETAILED DESCRIPTION OF THE PREFERRED EMBODIMENTS

Figure 4:
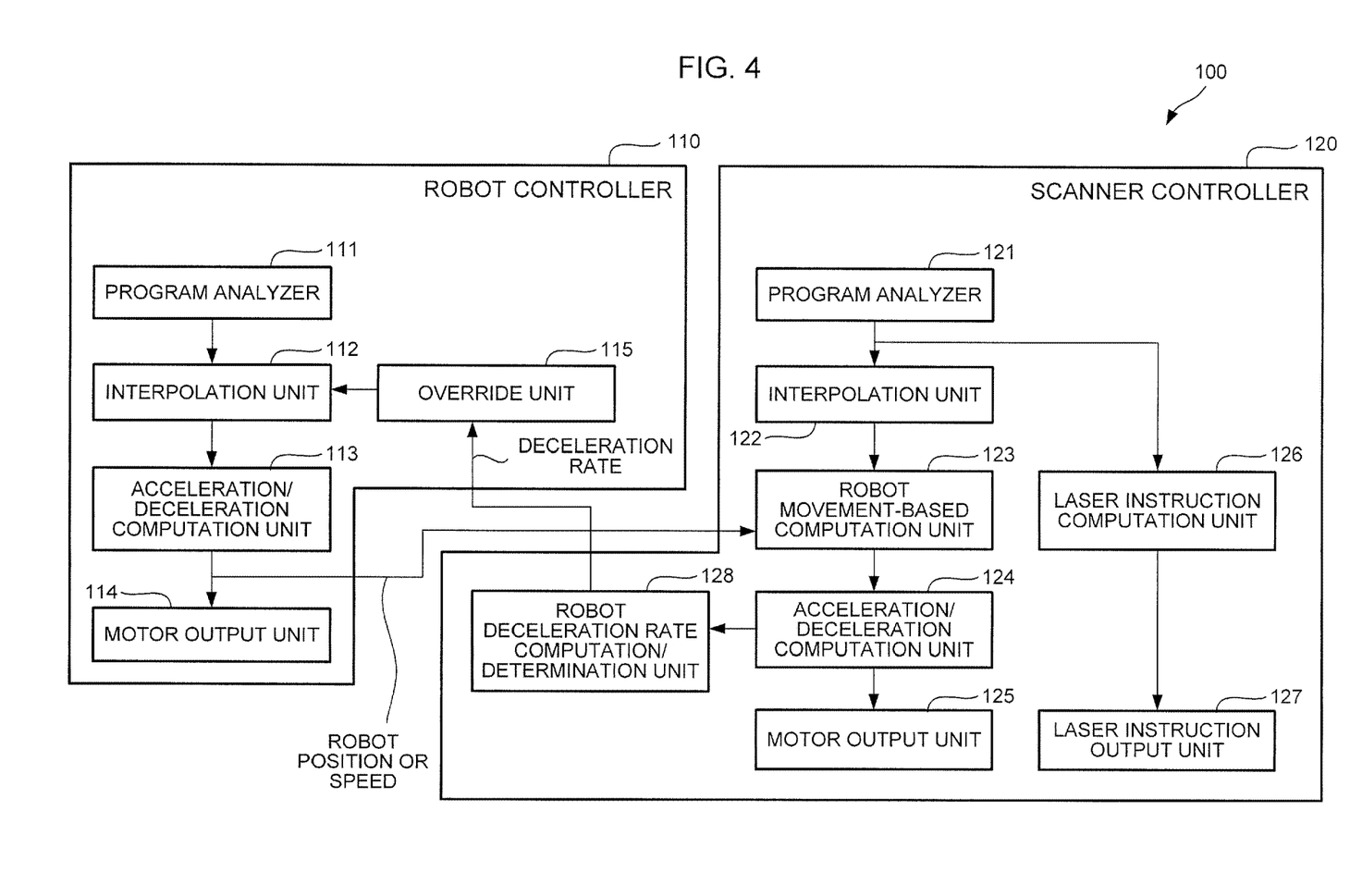
FIG. 4 is a block diagram illustrating a configuration of a remote laser welding robot system according to an embodiment of the invention.
Figure 5:
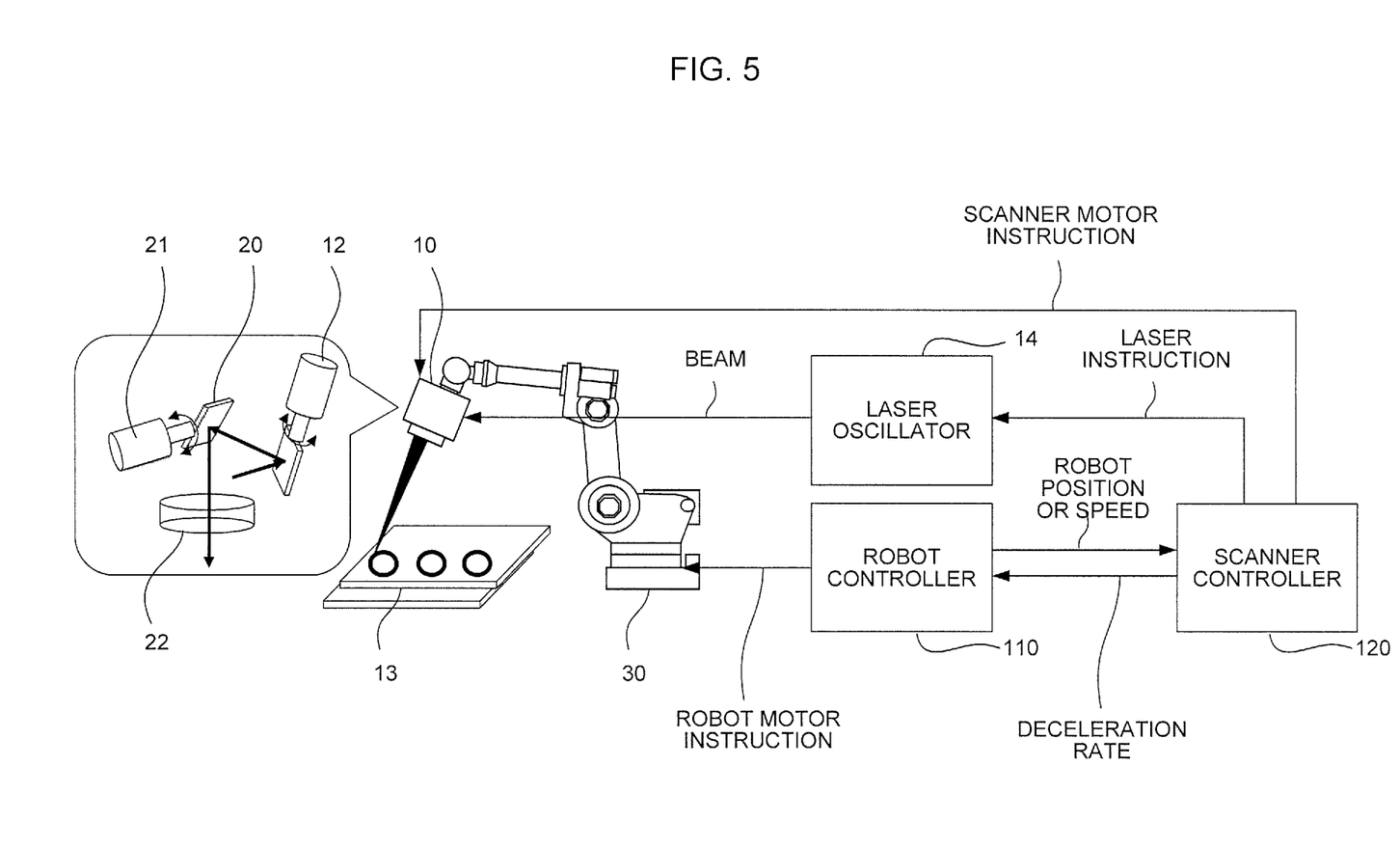
FIG. 5 is a schematic diagram illustrating a configuration of the remote laser welding robot system.

FIG. 4 is a block diagram illustrating a configuration of a remote laser welding robot system 100 according to an embodiment of the invention. In addition, FIG. 5 is a schematic diagram illustrating a configuration of the remote laser welding robot system 100.

The remote laser welding robot system 100 includes a robot controller 110 and a scanner controller 120. The robot controller 110 is a numerical controller for controlling a robot. The scanner controller 120 is a numerical controller for controlling a scanner 10.

The robot controller 110 has a program analyzer 111, an interpolation unit 112, an acceleration/deceleration computation unit 113, a motor output unit 114, and an override unit 115.

The program analyzer 111 analyzes a program describing a movement instruction of the robot 30 to compute a movement route or speed of the robot 30. The interpolation unit 112 performs interpolation for the movement route computed by the program analyzer 111. The acceleration/deceleration computation unit 113 performs a control for applying acceleration or deceleration to the movement speed computed by the program analyzer 111, for example, when the movement route includes a corner portion or the like. In addition, the acceleration/deceleration computation unit 113 outputs the position or speed of the robot 30 after acceleration or deceleration to a robot movement-based computation unit 123 of the scanner controller 120. The motor output unit 114 controls the motor output power depending on the movement route and speed output from the interpolation unit 112 and the acceleration/deceleration computation unit 113 to move the robot 30 in practice. The program analyzer 111, the interpolation unit 112, the acceleration/deceleration computation unit 113, and the motor output unit 114 are typical elements of a general robot controller.

The override unit 115 is a processing unit for changing the movement speed of the robot 30 depending on an external signal. According to this embodiment, the override unit 115 receives a deceleration rate output from a robot deceleration rate computation/determination unit 128 (described below) of the scanner controller 120 and corrects the movement speed calculated by the program analyzer 111 on the basis of this deceleration rate. That is, the movement speed of the robot 30 is decelerated by the same rate as this deceleration rate. This override unit 115 is a characteristic element of the robot controller 110 according to this embodiment.

The scanner controller 120 includes a program analyzer 121, an interpolation unit 122, the robot movement-based computation unit 123, an acceleration/deceleration computation unit 124, a motor output unit 125, a laser instruction computation unit 126, a laser instruction output unit 127, and the robot deceleration rate computation/determination unit 128.

The program analyzer 121 analyzes the program describing the laser irradiation position and the laser output condition (power) to compute a laser scanning route, or a scanning speed or power. The interpolation unit 122 performs interpolation for the scanning route computed by the program analyzer 121. The robot movement-based computation unit 123 receives a position or speed of the robot 30 output from the acceleration/deceleration computation unit 113 of the robot controller 110 and corrects the scanning route or speed computed by the program analyzer 121 to eliminate the influence of the movement of the robot 30. The acceleration/deceleration computation unit 124 performs a control for further applying acceleration or deceleration to the scanning speed corrected by the robot movement-based computation unit 123, for example, when the scanning route includes a corner portion or the like. The motor output unit 125 controls the motor output power depending on the scanning route and the scanning speed output from the interpolation unit 122 and the acceleration/deceleration computation unit 124 to move the laser irradiation point in practice. The laser instruction computation unit 126 and the laser instruction output unit 127 output laser beams to the laser oscillator 14 (refer to FIG. 5 because not shown in FIG. 4) depending on the power computed by the program analyzer 121. The program analyzer 121, the interpolation unit 122, the robot movement-based computation unit 123, the acceleration/deceleration computation unit 124, the motor output unit 125, and the laser instruction computation unit 126 are typical elements of a general scanner controller.

The robot deceleration rate computation/determination unit 128 computes the deceleration rate which is a ratio between the scanning speed computed by the robot movement-based computation unit 123 and the scanning speed output from the acceleration/deceleration computation unit 124. The deceleration rate may also be expressed as a ratio between the instructed speed described in the program and the laser scanning speed observed on the workpiece 13. The robot deceleration rate computation/determination unit 128 notifies this deceleration rate to the override unit 115 of the robot controller 110 described above. Note that the robot deceleration rate computation/determination unit 128 may determine whether or not the deceleration rate is to be notified to the override unit 115 before the notification. For example, notification may not be performed when the deceleration rate is not equal to or smaller than a predetermined threshold value. The robot deceleration rate computation/determination unit 128 is a characteristic element of the scanner controller 120 according to this embodiment.

In this manner, the remote laser welding robot system 100 according to this embodiment has a route for notifying the robot of the occurrence of deceleration on the side of the scanner toward the robot controller 110 from the scanner controller 120. As an interface for this route, according to this embodiment, the override unit 115 and the robot deceleration rate computation/determination unit 128 are newly added.

In the related art, an instructed route is deviated from an actual machining route because the robot side does not know an acceleration/deceleration motion of the scanner side. Meanwhile, according to this embodiment, the robot side can detect acceleration or deceleration of the scanner side. Therefore, it is possible to allow a motion of the robot 30 to follow acceleration or deceleration of the scanner 10. As a result, even when acceleration/deceleration occurs in the scanner side, it is possible to match an instructed route with an actual machining route.

Figure 6:
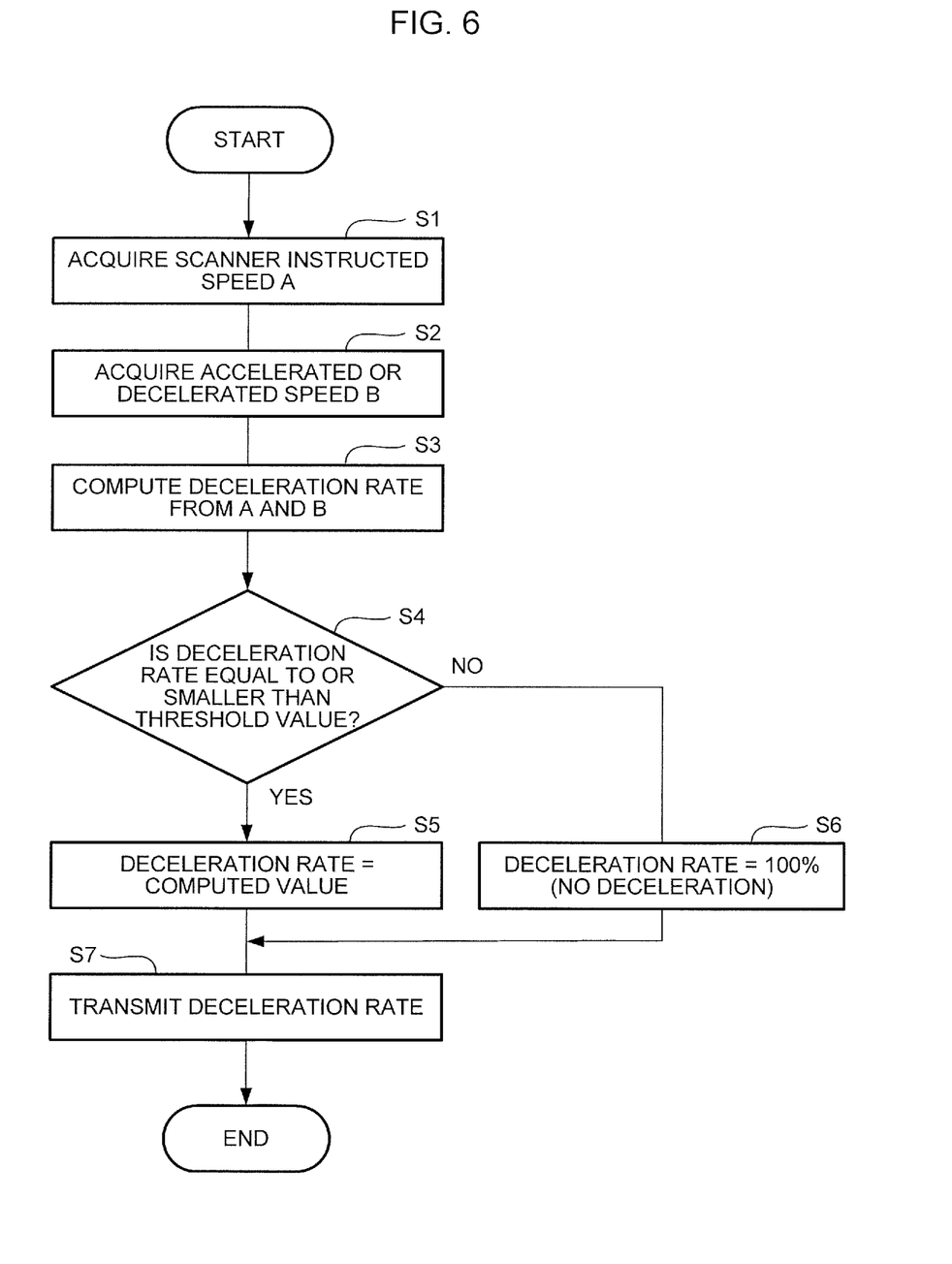
FIG. 6 is a flowchart illustrating operations of the remote laser welding robot system.

Operations of the scanner controller 120 side of the remote laser welding robot system 100 will be described in more details with reference to the flowchart in FIG. 6.

Step S1: the program analyzer 121 analyzes a program to compute a laser scanning speed (instructed speed). The robot movement-based computation unit 123 corrects the instructed speed considering the movement of the robot 30 (this is set as an instructed speed A).

Step S2: the acceleration/deceleration computation unit 124 performs a control for decelerating the instructed speed A, for example, when the scanning route includes a corner portion or the like (here, the decelerated speed is set as a speed B).

Step S3: the robot deceleration rate computation/determination unit 128 computes a deceleration rate which is a ratio between the instructed speed A and the decelerated speed B. For example, a ratio of the decelerated speed B to the instructed speed A expressed by a percentage may be set as deceleration rate. However, without limiting thereto, the deceleration rate may also be defined in any other expression.

Step S4: if the deceleration rate is equal to or smaller than a predetermined threshold value, the process proceeds to step S5. Otherwise, the process proceeds to step S6.

Step S5: the robot deceleration rate computation/determination unit 128 determines the deceleration rate computed in step S3 as a value to be transmitted to the robot controller 110.

Step S6: the robot deceleration rate computation/determination unit 128 determines a value representing no deceleration (for example, 100%) as the value to be transmitted to the robot controller 110.

Step S7: the robot deceleration rate computation/determination unit 128 transmits the value determined in step S5 or S6 to the override unit 115 of the robot controller 110.

In this manner, in the scanner controller 120 according to this embodiment, the robot deceleration rate computation/determination unit 128 determines whether or not deceleration is to be applied in the robot side. If it is determined that deceleration is applied, the deceleration rate is notified to the robot controller 110. As a result, when it is not necessary to decelerate the robot side, it is possible to adjust the robot not to perform unnecessary deceleration. For example, when degradation of the machining route accuracy is allowed at a certain level, and it is desired to improve a cycle time instead, it is possible to adjust an accuracy degradation allowance by appropriately setting the threshold value.

According to this embodiment, in the remote laser welding robot system, it is possible to improve the machining route accuracy without necessity of adding a countermeasure such as addition of the air-cut to the program of the scanner side.

Note that, without limiting to the aforementioned embodiments, the invention may be appropriately changed without departing from the spirit and scope of the invention. A modification or omission of any element in the embodiments may be possible within the scope of the invention. For example, although the scanner controller 120 notifies the deceleration rate to the robot controller 110 in this embodiment, the invention is not limited thereto. For example, the scanner controller 120 may be modified such that the robot controller 110 side outputs any value (including the instructed speed, the current scanning speed, or the like) so as to allow the robot controller 110 side to use it in computation of the deceleration rate.

The invention claimed is:

1. A scanner controller comprising:
a processor configured to:
acquire a laser scanning route and an instructed speed for a scanner;

adjust the laser scanning route or speed for the scanner based upon received position or speed information of an associated robot;

perform an acceleration or deceleration control for the adjusted laser scanning speed to control a laser output power of the scanner;

determine a deceleration rate of the scanner; and output the determined deceleration rate to a robot controller to adjust a deceleration rate of a speed of the associated robot to the deceleration rate of the scanner when the determined deceleration rate is less than or equal to a threshold value, wherein the adjusted deceleration rate of speed of the associated robot is at a same rate as the deceleration rate of the scanner.

2. The scanner controller according to claim 1, wherein the processor is further configured to output information on a ratio between the speed of the scanner after being subjected to the acceleration/deceleration control and the instructed speed.

3. The scanner controller according to claim 1, wherein the instructed speed is obtained by correcting a machining speed instructed from a program depending on a movement of the robot installed with the scanner.

4. The scanner controller according to claim 1, wherein the determined deceleration rate of the scanner is a ratio between the laser scanning speed and the adjusted laser scanning speed.

5. A robot controller comprising:

a processor configured to:

acquire a movement route and speed of a robot;

perform an acceleration/deceleration control of the robot for the acquired movement route and speed of the robot;

output, to an associated scanner controller, information on a position and speed of the robot after the acceleration/deceleration control; and adjust the movement route and speed of the robot based upon an external signal containing information received from the scanner controller, wherein an acceleration or deceleration rate of the robot is at a same rate as an acceleration or deceleration rate of an associated scanner.

6. A remote laser welding robot system comprising:

a first acceleration/deceleration processor configured to:

acquire a laser scanning route and a first instructed speed for a scanner; and perform a first acceleration/deceleration control of the scanner for the instructed speed;

a robot deceleration rate processor configured to:

adjust the laser scanning route or speed for the scanner based upon received position or speed information of an associated robot; and output, to the associated robot, information on a speed of the scanner after being subjected to the first acceleration/deceleration control from the first acceleration/deceleration processor;

a scanner controller configured to control a laser output power of the scanner based upon the adjusted laser scanning route or speed for the scanner;

a second acceleration/deceleration processor configured to:

acquire a movement route and speed of the associated robot; and perform a second acceleration/deceleration control of the associated robot for the acquired movement route and speed of the associated robot;

an override receiver configured to receive information on a speed of the scanner after being subjected to the first acceleration/deceleration control and adjust the movement route and speed of the associated robot based upon the output information on the speed of the scanner; and a robot controller configured to control a movement of a robot, wherein the second acceleration/deceleration processor is configured to perform the second acceleration/deceleration control of the associated robot at a same deceleration rate as the deceleration rate of the scanner.

* * * * *